US009529373B2

(12) United States Patent
Yuan

(10) Patent No.: US 9,529,373 B2
(45) Date of Patent: Dec. 27, 2016

(54) SWITCHING REGULATOR AND CONTROL CIRCUIT AND CONTROL METHOD THEREFOR

(71) Applicant: Silergy Semiconductor Technology (Hangzhou) Ltd., Hangzhou (CN)

(72) Inventor: Xiaolong Yuan, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 76 days.

(21) Appl. No.: 14/572,125

(22) Filed: Dec. 16, 2014

(65) Prior Publication Data

US 2015/0177756 A1 Jun. 25, 2015

(30) Foreign Application Priority Data

Dec. 19, 2013 (CN) .......................... 2013 1 0706484

(51) Int. Cl.

| | |
|---|---|
| ***H02M 3/156*** | (2006.01) |
| ***G05F 1/56*** | (2006.01) |
| ***H02M 3/158*** | (2006.01) |
| *H02M 1/00* | (2006.01) |

(52) U.S. Cl.

CPC .............. *G05F 1/56* (2013.01); *H02M 3/1588* (2013.01); *H02M 2001/0032* (2013.01); *Y02B 70/1466* (2013.01); *Y02B 70/16* (2013.01)

(58) Field of Classification Search

CPC .... H02M 3/155; H02M 3/156; H02M 3/1588; H02M 3/157; H02M 3/1563; G05F 1/56; G05F 1/575

USPC ................................ 323/271, 280–285, 351

See application file for complete search history.

(56) References Cited

U.S. PATENT DOCUMENTS

| | | | | |
|---|---|---|---|---|
| 4,825,144 A * | 4/1989 | Alberkrack | H02M 3/28 | 323/272 |
| 6,069,471 A * | 5/2000 | Nguyen | G05B 13/021 | 323/271 |
| 6,621,256 B2 * | 9/2003 | Muratov | H02M 3/1563 | 323/282 |
| 7,800,352 B2 * | 9/2010 | Qiu | H02M 3/156 | 323/284 |
| 8,018,694 B1 * | 9/2011 | Wu | H02M 1/32 | 361/18 |
| 8,829,878 B2 * | 9/2014 | Noda | H02M 3/1588 | 323/284 |
| 2008/0290911 A1 * | 11/2008 | Williams | H03K 17/6872 | 327/109 |

(Continued)

FOREIGN PATENT DOCUMENTS

| | | |
|---|---|---|
| CN | 102684458 A | 9/2012 |
| CN | 103368360 A | 10/2013 |

(Continued)

*Primary Examiner* — Adolf Berhane

(74) *Attorney, Agent, or Firm* — Westman, Champlin & Koehler, P.A.

(57) ABSTRACT

Disclosed are a switching regulator and a control circuit and a control method therefor. In one embodiment, by means of controlling a rectifying switch in a power stage with a second control signal which has a predetermined frequency and varies in accordance with the difference between a feedback voltage and a reference voltage, more energy may be shunted when a switching regulator operates in a light loaded or unloaded condition, so that audio noise is avoided.

18 Claims, 8 Drawing Sheets

(56) References Cited

U.S. PATENT DOCUMENTS

| | | | | |
|---|---|---|---|---|
| 2011/0133711 | A1* | 6/2011 | Murakami | H03K 17/0822 323/282 |
| 2012/0091981 | A1* | 4/2012 | Komiya | H02M 3/156 323/282 |
| 2013/0147454 | A1* | 6/2013 | Wang | G05F 1/618 323/283 |
| 2013/0207627 | A1* | 8/2013 | Kahn | G05F 1/46 323/271 |
| 2014/0266123 | A1* | 9/2014 | Rader | H02M 3/156 323/288 |
| 2015/0326123 | A1* | 11/2015 | Fukushima | H02M 3/158 323/271 |

FOREIGN PATENT DOCUMENTS

| | | | |
|---|---|---|---|
| CN | 103401404 | A | 11/2013 |
| CN | 103683868 | A | 3/2014 |
| CN | 103683869 | A | 3/2014 |

* cited by examiner

SWITCHING REGULATOR AND CONTROL CIRCUIT AND CONTROL METHOD THEREFOR

CLAIM OF PRIORITY AND CROSS-REFERENCE TO RELATED APPLICATION(S)

This application claims the benefit of Chinese Patent Application No. 201310706484.7, filed on Dec. 19, 2013, which is incorporated herein by reference in its entirety.

BACKGROUND OF THE INVENTION

1. Field of the Invention

The present disclosure relates to the field of power electronics, and particularly to a switching regulator and a control circuit and a control method therefor.

2. Description of the Related Art

A switching regulator typically comprises a power stage and a control circuit. The control circuit can consider variations in an input voltage, internal parameters and external loads, and may regulate the ratio of on/offtime of the switch system in the power stage, so that an output voltage or an output current of the switching regulator can be maintained as substantially constant. Therefore, the design of a particular control circuitry and approach is very important to the overall performance of the switching regulator. Thus, adopting different detection signals and/or control circuits may lead to different control effects on performance.

The control patterns of a switching regulator comprise constant frequency control and variable frequency control. The constant frequency control (i.e. Pulse Width Modulation, PWM) is a control method in which the switching period is maintained constant, and the voltage regulation is achieved by adjusting the on time of a switch in a switching period.

The variable frequency control (i.e. Pulse Frequency Modulation, PFM) comprises various control methods such as constant on time control, constant off time control, current hysteresis control, etc. In constant on time control, the on time of a power switch is maintained constant, and the duty cycle is adjusted by changing the off time of the power switch. In constant off time control, the off time of the power switch is maintained constant, and the duty cycle is adjusted by changing the on time of the power switch.

When the load of the switching regulator varies, for the purpose of power loss reduction, the prior art typically reduces the on/off times of the power switch in the power stage by omitting or shielding pulses (i.e. reducing the frequency of switching control signal), so that the control circuit operates in an intermittent manner.

However, when the frequency of the switching control signal drops into audio range (20 Hz to 20 KHz), the on/off of the switch may lead to audio noise.

BRIEF DESCRIPTION OF THE INVENTION

In view of this, one object of the present disclosure is to provide a switching regulator and a control circuit and a control method therefor.

According to one aspect of the present disclosure, there is provided a control circuit comprising a first controller and a second controller.

The first controller is configured to generate a first control signal for controlling a power switch in a power stage in accordance with a feedback voltage representing an output voltage of the power stage, a ripple signal and a reference voltage.

The second controller is configured to generate a second control signal with a predetermined frequency for controlling a rectifying switch in the power stage. Wherein, a duty cycle thereof varies with a difference between the feedback voltage and reference voltage.

According to another aspect of the present disclosure, there is provided a switching regulator comprising a power stage with a power switch and a rectifying switch and an abovementioned control circuit.

According to another aspect of the present disclosure, there is provided a method for controlling a switching regulator which comprising: generating a first control signal for controlling a power switch in a power stage in accordance with a feedback voltage representing output voltage of the power stage, a ripple signal and a reference voltage; and generating a second control signal with a predetermined frequency for controlling a rectifying switch in the power stage, the duty cycle of which varies with a difference between the feedback voltage and the reference voltage.

In the present disclosure, by means of controlling the rectifying switch in the power stage with the second control signal which has a predetermined frequency and varies in accordance with the difference between the feedback voltage and the reference voltage, more energy may be shunted when a switching regulator operates in a light loaded or unloaded condition, so that audio noise is avoided.

BRIEF DESCRIPTION OF THE DRAWINGS

The implementations of the disclosure are illustrated in the drawings. The drawings and implementations provide some embodiments of the disclosure non-exclusively without limitation, wherein.

DETAILED DESCRIPTION OF EMBODIMENTS OF THE INVENTION

Reference will now be made in detail to particular embodiments of the disclosure, examples of which are illustrated in the accompanying drawings. However, the present disclosure is intended to encompass any substitutions, modifications, equivalents, etc., made thereto without departing from the spirit and scope of the present disclosure. In the description below, a number of particular details are explained to provide a better understanding to the disclosure. However, it is apparent to those skilled in the art the disclosure can be implemented without these particular details. In other instances, well known circuits, materials or methods are not described so as not to obscure the aspects of the present disclosure.

In addition, it is to be understood that the drawings are only for illustration purpose, and these drawings are not necessarily drawn to scale. Also, it is to be understood that when an element is referred to as being "connected to," or "coupled to" another element, it may be directly connected or coupled to the other element, or intervening elements may be present. Two elements may be connected to each other physically, electronically, logically, or in any other manner, through one or more additional elements. In contrast, when an element is referred to as being"directly connected to," or "directly coupled to" another element, there may be no intervening elements present. Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to."

Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

In the description below, expressions such as "first," and "second," are used herein for purposes of description and are not intended to indicate or imply relative importance or significance. In addition, unless the context clearly requires otherwise, term "a plurality of" is to be construed as "more than two".

In the description below, "power switch" refers to a switch element in a switching regulator, by turning on which, an inductive element in the switching regulator starts to accumulate energy which leads to a rise on a current level of the inductive element. Correspondingly, "rectifying switch" refers to a switch element in a switching regulator, by turning on which, the inductive element starts to release energy which leads to a drop on the current level of the inductive element.

The present disclosure may be presented in various forms, some examples of which will be described below.

Figure 1:
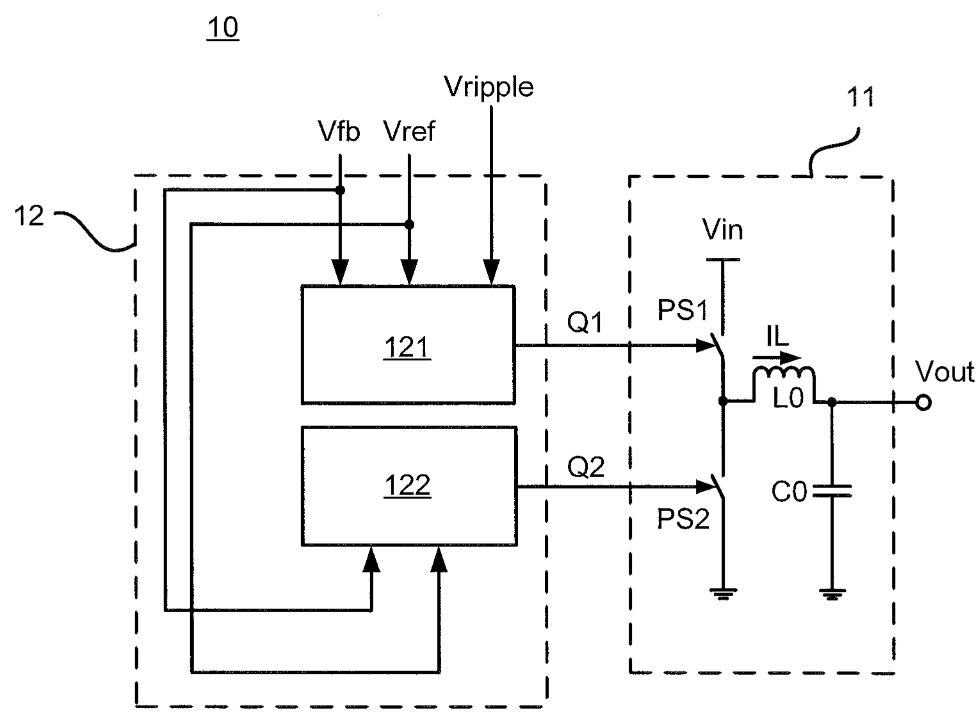
FIG. 1 is a schematic diagram of a switching regulator in accordance with a first embodiment of the present disclosure.

FIG. 1A is a schematic diagram of a switching regulator in accordance with a first embodiment of the present disclosure. As shown in FIG. 1A, switching regulator 10 comprises power stage 11 and control circuit 12. Power stage 11 comprises power switch PS1, rectifying switch PS2, inductive element L0 and filtering element C0. In present disclosure, a power switch in a power stage refers to a switch which is turned on periodically so that power flows into the inductive element, and the energy is accumulated by the inductive element in a DC-DC regulator. A rectifying switch refers to a switch which is turned on periodically so that the power stored in the inductive element may flow to a load in a DC-DC regulator.

In the embodiment of the present disclosure, power switch PS1 may be any controlled semiconductor switching device, such as Metal-Oxide-Semiconductor Field Effect Transistor (MOSFET) and Insulated Gate Bipolar Transistor (IGBT) etc. Rectifying switch PS2 is electrically coupled to power switch PS1. In the embodiment of the present disclosure, rectifying switch PS2 may be any controlled semiconductor switch device, such as Metal-Oxide-Semiconductor Field Effect Transistor (MOSFET) and Insulated Gate Bipolar Transistor (IGBT) etc. Inductive element L0 is electrically coupled to power switch PS1 which switches between states of accumulating power and releasing power with on and off states. Inductive element L0 may be an inductor or a transformer. Filtering element C0 is configured to smooth output voltage Vout, which may be a capacitor or a filtering circuit.

Control circuit 12 comprises first controller 121 and second controller 122.

First controller 121 is configured to generate first control signal Q1 to control power switch PS1 in the power stage in accordance with feedback voltage Vfb, ripple signal Vripple and reference voltage Vref. Wherein, feedback Vfb is obtained in accordance with output voltage Vout of the power stage.

Ripple signalVripple is generated by any ripple generator well known by those skilled in the art. For example, the ripple signal may be obtained by sampling inductor current IL in the power stage, or be obtained in accordance with first control signal Q1 fed back or a signal synchronizing therewith. Essentially, ripple signalVripple represents energy peak and/or energy valley of the inductive element, which may vary synchronously and in phase with inductor current IL.

Second controller 122 is configured to generate second control signal Q2 with a predetermined frequency to control rectifying switch PS2 in the power stage, and the duty cycle thereof varies in accordance with a difference between feedback voltage Vfb and reference voltage Vref input thereto. The greater the difference, the greater the duty cycle. In other words, the duty cycle is a function of the difference which increases with the difference.

When the switching regulator is in operation, first controller 121 generates switching control signal to control the power switch. In a normal condition, since there is no variation or minor variation of a load, the output voltage of the power stage is maintained substantially constant.

In the normal condition, the difference between feedback voltage Vfb varying with the output voltage and reference voltage Vref is maintained constant approximately at zero. Therefore, the switching frequency and on-time of rectifying switch PS2 controlled by second controller 122 is substantially constant, so that energy released through rectifying switch PS2 during each switching period is substantially constant.

When the load decreases so that power stage 11 operates in an unloaded or light loaded condition, output voltage Vout increases and inductor current IL decreases at a lower speed because of the decreasing load, which results in a longer switching period and a lower frequency of the first control signal. Therefore, if not compensated, audio noise may occur.

In the embodiment of the present disclosure, second control signal Q2 output by second controller 122 has a duty cycle varying with the difference between feedback voltage Vfb and reference voltage Vref. When output voltage Vout increases and the drop of inductor current IL slows down, feedback voltage Vfb rises, so that the difference between feedback voltage Vfb and reference voltage Vref rises, which leads to greater duty cycle of second control signal Q2. In this case, if the switching period of rectifying switch PS2 is constant, the on time would increase, so that the energy released through rectifying switch PS2 in each switching period increases. Since the energy released through rectifying switch PS2 increases, the current through the inductive element in the power stage is shunted, so that the drop of the inductor current is accelerated, which results in that the variation caused by the load is compensated without dramatically increasing the switching period of the first control signal. Therefore, in a light loaded or unloaded condition, the switching frequency of power switch PS1 can be maintained out of audio frequency band.

Preferably, the predetermined frequency is greater than or equals to 20 KHz.

In the embodiment of the present disclosure, by means of controlling the rectifying switch in the power stage with the second control signal which has a predetermined frequency and varies in accordance with the difference between a feedback voltage and a reference voltage, more energy may be shunted when the switching regulator operates in a light loaded or unloaded condition, so that audio noise is avoided.

Figure 2A:
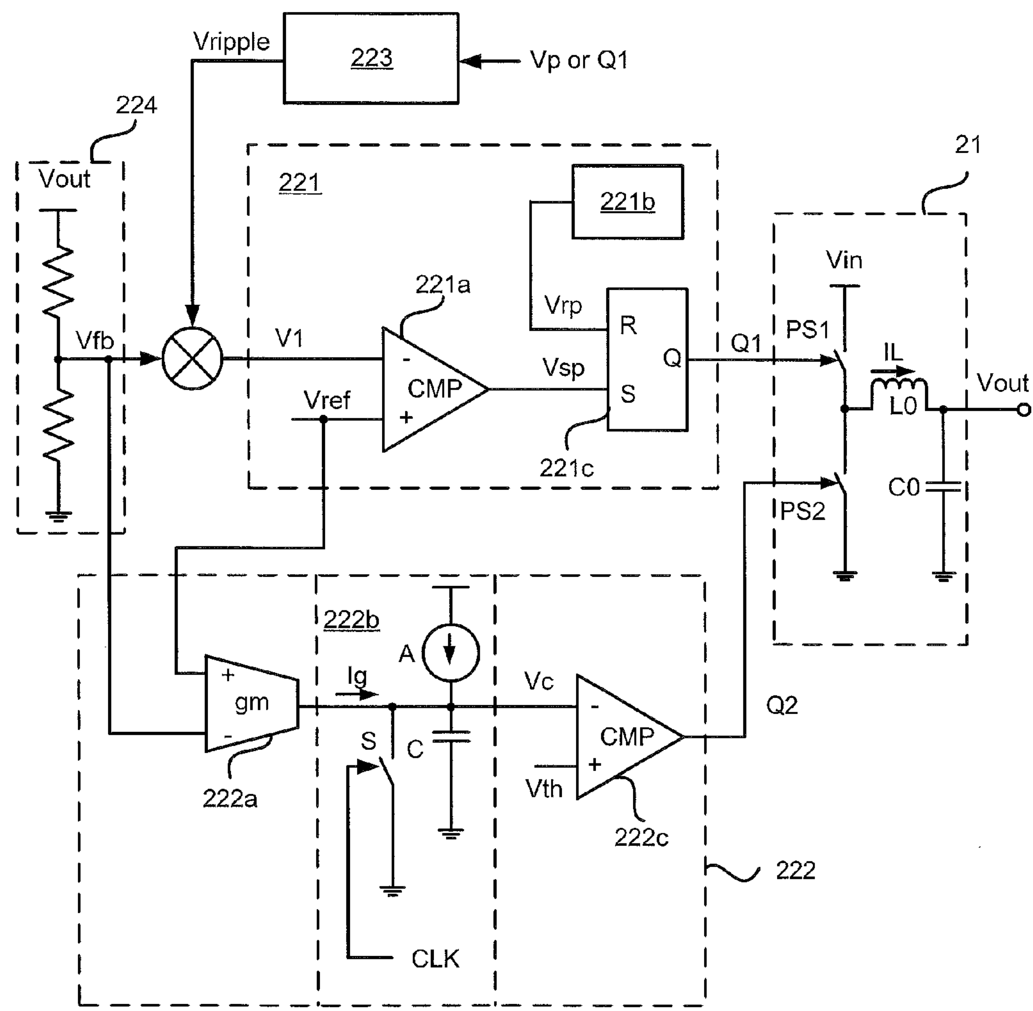
FIG. 2A is a schematic diagram of a switching regulator in accordance with a second embodiment of the present disclosure.

FIG. 2A is a schematic diagram of a switching regulator in accordance with a second embodiment of the present disclosure. As shown in FIG. 2A, switching regulator 20 comprises power stage 21 and control circuit 22. Wherein, the structure of power stage 21 is substantially the same to that shown in FIG. 1, and will not be illustrated here. It is to be understood by those skilled in the art that power stage 21 may adopt well-known circuit topologies such as the buck topology and the boost topology as necessary.

Control circuit 22 comprises first controller 221 and second controller 222.

First controller 221 is configured to generate first control signal Q1 to control power switch PS1 in the power stage in accordance with feedback voltage Vfb, ripple signalVripple and reference voltage Vref. Wherein, feedback voltage Vfb is obtained in accordance with output voltage Vout of the power stage.

Ripple signalVripple is generated by any ripple generator well known by those skilled in the art. Ripple signalVripple may be obtained in accordance with voltage Vp on a phase node of the power stage or in accordance with first control signal Q1 fedback. Essentially, ripple signalVripple is a signal representing the energy peak and/or energy valley of the inductive element, which may vary synchronously and in phase with inductor current IL. In the present disclosure, a phase node in a power stage refers to a node in a DC-DC regulator on which the voltage reverses polarity in accordance with on and off of a power switch, wherein, in a buck topology, the phase node is the common node of the power switch and the rectifying switch.

Particularly, first controller 221 may comprise set pulse generator 221*a*, reset pulse generator 221*b* and logic circuit 221*c*. Set pulse generator 221*a* is configured to generate set pulse Vsp in accordance with feedback voltage Vfb, ripple signalVripple and reference voltage Vref. In the embodiment of the present disclosure, set pulse generator 221*a* generates set pulse Vsp approximately at the energy peak or energy valley of the inductive element in accordance with feedback voltage Vfb, ripple signalVripple and predetermined reference voltage Vref.

Figure 2B:
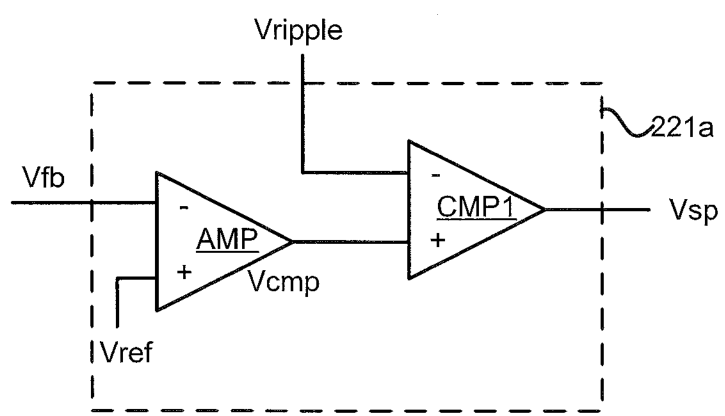
FIG. 2B is a schematic diagram of an alternative implementation of a set pulse generator in the switching regulator in accordance with the second embodiment of the present disclosure.
Figure 2C:
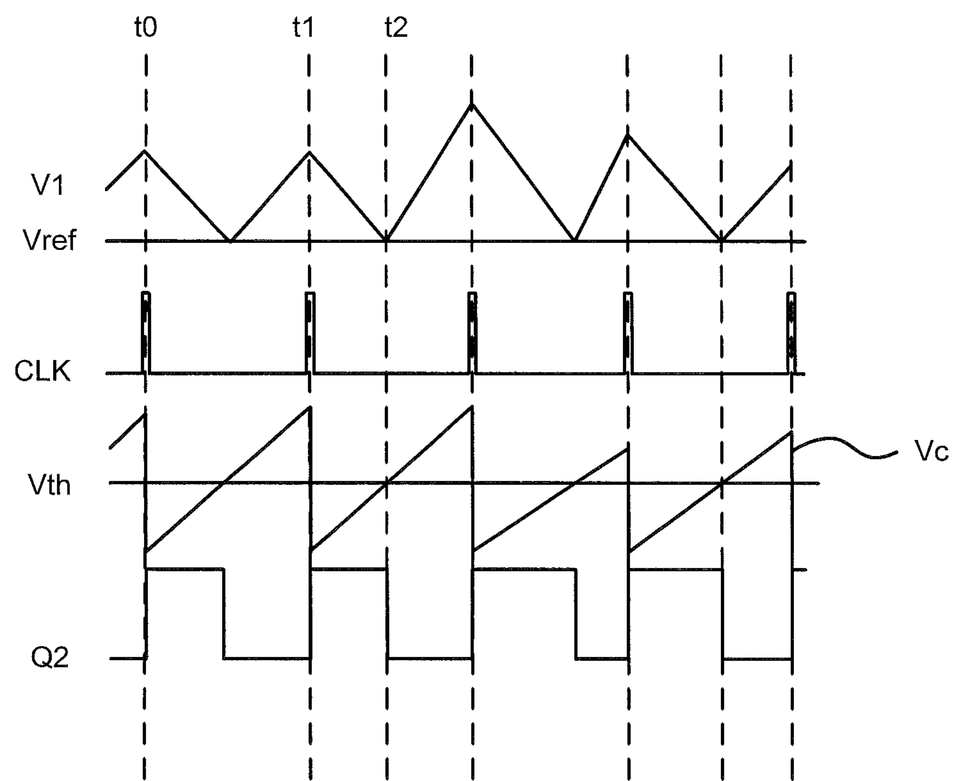
FIG. 2C is a waveform diagram showing example operation of the switching regulator in accordance with the second embodiment of the present disclosure.

Alternatively, set pulse generator 221*a* may adopt a circuit illustrated in FIG. 2A, wherein, voltage V1 obtained by superimposing feedback voltage Vfb and ripple signalVripple is implemented to an inverting input terminal of a comparator, and reference voltage Vref is implemented to a non-inverting input terminal of the comparator, so that the comparator can generate set pulse Vsp approximately at the energy peak or energy valley of the inductive element by comparing voltage V1 and reference voltage Vref, as shown in FIG. 2C.

Alternatively, set pulse generator 221*a* may adopt a circuit illustrated in FIG. 2B, wherein output voltage Vout of the power stage is fed back directly or through voltage feedback circuit 224 to an inverting input terminal of operational amplifier AMP, and reference voltage Vref is implemented to a non-inverting input terminal of operational amplifier AMP. Output terminal of operational amplifier AMP is coupled to a non-inverting input terminal of comparator CMP1, which outputs error voltage Vcmp. Ripple generator 223 is coupled to an inverting input terminal of comparator CMP1. Ripple generator 223 may be coupled to one terminal of the inductive element of the power stage (e.g. inductor L0 shown in FIG. 2A). In this case, ripple generator 223 is preferably a current sampling circuit. The current sampling circuit may represent the current through the inductive element as ripple signalVripple which is output to comparator CMP1. Alternatively, ripple generator 233 may also obtain ripple signalVripple varying with inductor current IL synchronously and in phase in accordance with first control signal Q1 fed back. Comparator CMP1 compares error voltage Vcmp with ripple signalVripple to output set pulse Vsp at the energy valley of the inductive element.

Reset pulse generator 211*b* is configured to generate reset pulse Vrp.

In a preferred embodiment, reset pulse generator 221*b* is a constant on-time reset pulse generator. It can be understood by skilled in the art that reset pulse generator 221*b* may adopt other kinds of pulse generators.

Logic circuit 221*c* is configured to output first control signal Q1 which turns on the power switch when set pulse Vsp occurs and turns off the power switch when reset pulse Vrp occurs. Preferably, logic circuit 221*c* is an RS flip-flop as shown in FIG. 2A.

It is to be understood by those skilled in the art that, in the embodiments of the present disclosure, first controller 221 would adopt various kinds of power control circuits.

Second controller 222 is configured to generate second control signal Q2 with a predetermined frequency to control rectifying switch PS2 in the power stage, the duty cycle of which varies in accordance with a difference between feedback voltage Vfb and reference voltage Vref input thereto. The greater the difference, the greater the duty cycle. In other words, the duty cycle is a function of the difference, which increases with the difference.

Particularly, second controller 222 comprises error amplifier 222*a*, wave generator 222*b* and comparing circuit 222*c*.

Error amplifier 222*a*, which is coupled to wave generator 222*b*, is configured to output error signal f(Vfb−Vref) proportional to the difference between feedback voltage Vfb and reference voltage Vref according thereto.

Preferably, as shown in FIG. 2A, error amplifier 222*a* may be a transconductance amplifier.

Transconductance amplifier 222*a* outputs a transconductance current Ig=g(Vref−Vfb) in accordance with reference voltage Vref and feedback voltage Vfb respectively implementing to a non-inverting input terminal and an inverting input terminal, wherein, Ig refers to the transconductance current of transconductance amplifier 222*a*, and g refers to a transconductance coefficient.

Wave generator 222*b* which is coupled to comparing circuit 222*c*, is configured to generate a wave Vc with a predetermined frequency in accordance with error signal f(Vfb−Vref). Wave Vc rises from an initial level in a period corresponding to the predetermined frequency and drops to the initial level at the end of period, the slope thereof is determined by the error signal (i.e. the slope varies with the difference.)

When current Ig is adopted as the error signal, wave generator 222*b* may comprise current source A, capacitor C and discharge switch S. Wherein, current source A is coupled to capacitor C. Capacitor C is coupled between a common node and a ground in parallel with discharge switch S. The common node is coupled to an output terminal of transconductance amplifier 222*a* and an input terminal of second comparator 222*c*.

Discharge switch S is turned on and off at the predetermined frequency in accordance with a clock source, i.e. the clock source outputs a pulse in every predetermined period which turns on discharge switch S.

Comparing circuit 222*c* is configured to generate second control signal Q2 in accordance with wave Vc and constant threshold voltage Vth.

FIG. 2C is a waveform diagram showing example operation of the switching regulator shown in FIG. 2A. Capacitor C is charged in the time interval between two neighboring clock pulses. Voltage across capacitor Vc rises linearly, and the rising slope thereof is determined by current Ic through capacitor. Current Ic through capacitor equals to Is+Ig, wherein Is refers to the current value of current source A which is constant. Therefore, the rising slope and the peak value of voltage across capacitor Vc in a period are determined by Vref−Vfb. When Vfb is greater than Vref, transconductance amplifier 222*a* draws current from current source A, which leads to a decrease in the rising slope of wave Vc, so that time interval during which wave Vc is less than the constant threshold voltage increases. Then, on-time Ton of second control signal Q2 output by comparing circuit 222*c* for controlling the rectifying switch increases (i.e. on-time Ton of rectifying switch PS2 increases), so that more energy is released in a period through rectifying switch PS2, which results in that Vfb converges to Vref faster to maintain the output voltage substantially constant.

It is to be understood by those skilled in the art that though wave Vc is illustrated as a regular triangular wave in FIG. 2C, a variation of feedback voltage Vfb during the rise of wave Vc may lead to a corresponding variation in rising slope, and let the rising edge of wave Vc represent as a broken line (when there is a hopping in Vfb) or a curve (when Vfb changes continuously).

In the present embodiment, the wave output by the wave generator is controlled in accordance with the difference between the feedback voltage and the reference voltage, so that a second control signal for rectifying switch with longer on-time is generated when there is a larger deviation between the feedback voltage and the reference voltage. Therefore, it is not necessary for the first controller to change the switching frequency significantly, and the audio noise is avoided. The circuit in the present embodiment has advantages of compact structure, less switches and ease of implementation.

Figure 3A:
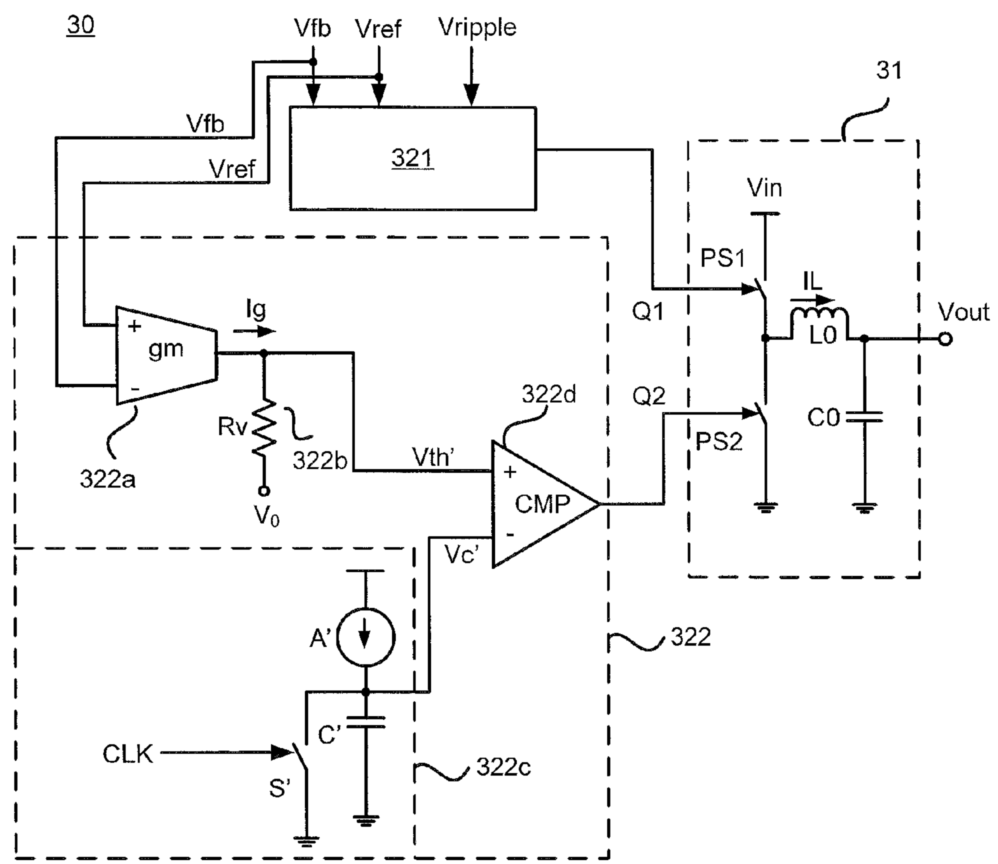
FIG. 3A is a schematic diagram of a switching regulator in accordance with a third embodiment of the present disclosure.

FIG. 3A is a schematic diagram of a switching regulator in accordance with a third embodiment of the present disclosure. As shown in FIG. 3A, switching regulator 30 in accordance with the embodiment of the present disclosure comprises power stage 31 and control circuit 32. Control circuit 32 comprises first controller 321 and second controller 322.

First controller 321 is configured to generate first control signal Q1 to control power switch PS1 in the power stage in accordance with feedback voltage Vfb and reference voltage Vref.

It is similar to the second embodiment that first controller 321 in the present embodiment may adopt various kinds of power switch controller well known by those skilled in the art, which will not be described herein.

Second controller 322 is configured to generate second control signal Q2 with a predetermined frequency to control rectifying switch PS2 in the power stage, and the duty cycle thereof varies in accordance with a difference between feedback voltage Vfb and reference voltage Vref input thereto. The greater the difference, the greater the duty cycle. In other words, the duty cycle is a function of the difference, which increases with the difference.

Second controller 322 is different from that of the second embodiment in circuit structure, which comprises error amplifier 322*a*, threshold generator 322*b*, triangular wave generator 322*c* and comparing circuit 322*d*.

Error amplifier 322*a*, which is coupled to threshold generator 322*b*, is configured to output error signal f(Vfb−Vref) proportional to the difference between feedback voltage Vfb and reference voltage Vref according thereto.

Threshold generator 322*b* is configured to generate threshold voltage Vth' varying with the error signal.

Preferably, as shown in FIG. 3A, error amplifier 322*a* may be a transconductance amplifier.

Transconductance amplifier 322*a* outputs a transconductance current Ig=g(Vref−Vfb) in accordance with reference voltage Vref and feedback voltage Vfb respectively implemented to a non-inverting input terminal and an inverting input terminal, wherein, Ig refers to the transconductance current of transconductance amplifier 322*a*, and g refers to a transconductance coefficient.

When a transconductance amplifier is adopted as error amplifier 322*a*, threshold generator 322*b* may be resistor Rv coupled between an output terminal of the transconductance amplifier and a reference terminal with voltage V0.

Therefore, threshold voltage Vth' equals to Ig*Rv+V0. Voltage V0 may promote the threshold voltage to a required level so as to match the amplitude of triangular wave Vc.

Figure 3B:
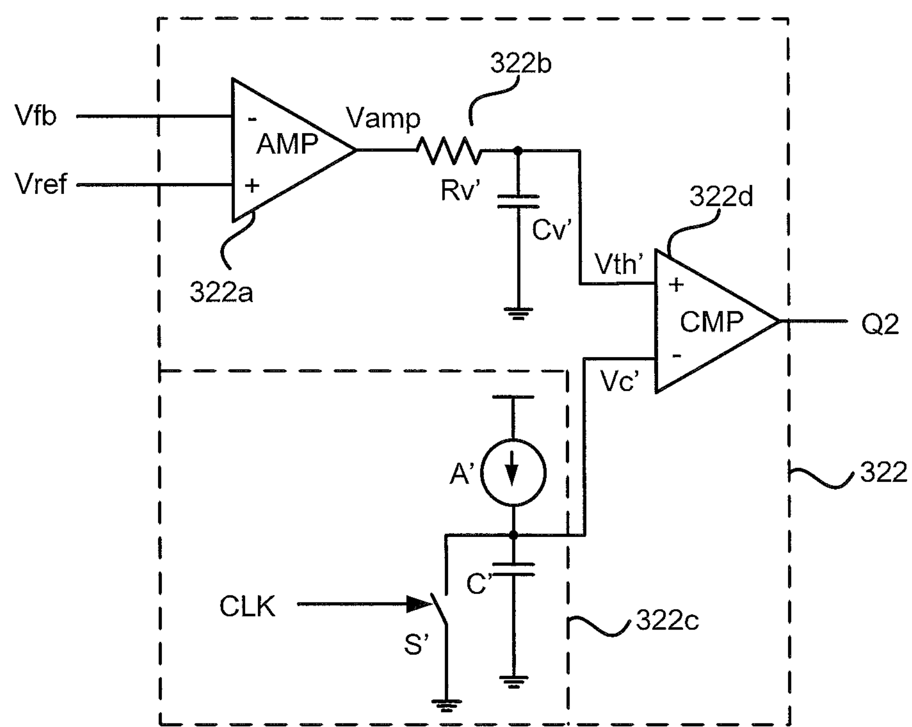
FIG. 3B is a schematic diagram of an alternative implementation of the second controller of the switching regulator in accordance with the third embodiment of the present disclosure.

Preferably, as shown in FIG. 3B, error amplifier 322*a* may be an operational amplifier.

In this case, threshold voltage 322*b* may be an RC circuit which comprises resistor Rv' coupled between an output terminal of the operational amplifier and an input terminal of comparing circuit 322*d* and capacitor Cv' coupled between the input terminal of comparing circuit 322*d* and the ground.

The operational amplifier outputs voltage Vamp=G(Vfb−Vref), wherein G refers to an amplification coefficient. When there is a variation in Vamp, the operational amplifier charges the capacitor through resistor Rv' until the voltage at each terminal of the resistor equals to each other, i.e. Vth' follows the variations of Vamp smoothly.

Triangular wave generator 322*c* is configured to generate triangular wave Vc' with a predetermined frequency and a predetermined amplitude. In the present embodiment, triangular wave generator 322*c* may adopt various kinds of circuitries such as a circuit comprising current source A', capacitor C' and discharge switch S'. Wherein, current source A' is coupled between an input power source and an output terminal, and capacitor C' is coupled between the common terminal and the ground in parallel with discharge switch S', and the output terminal is coupled to an input terminal of comparing circuit 322*d*.

Comparing circuit 322*d* is configured to generate second control signal Q2 in accordance with the triangular wave and the threshold voltage varying with the error signal. Preferably, comparing circuit 322*d* may be a comparator.

Figure 3C:
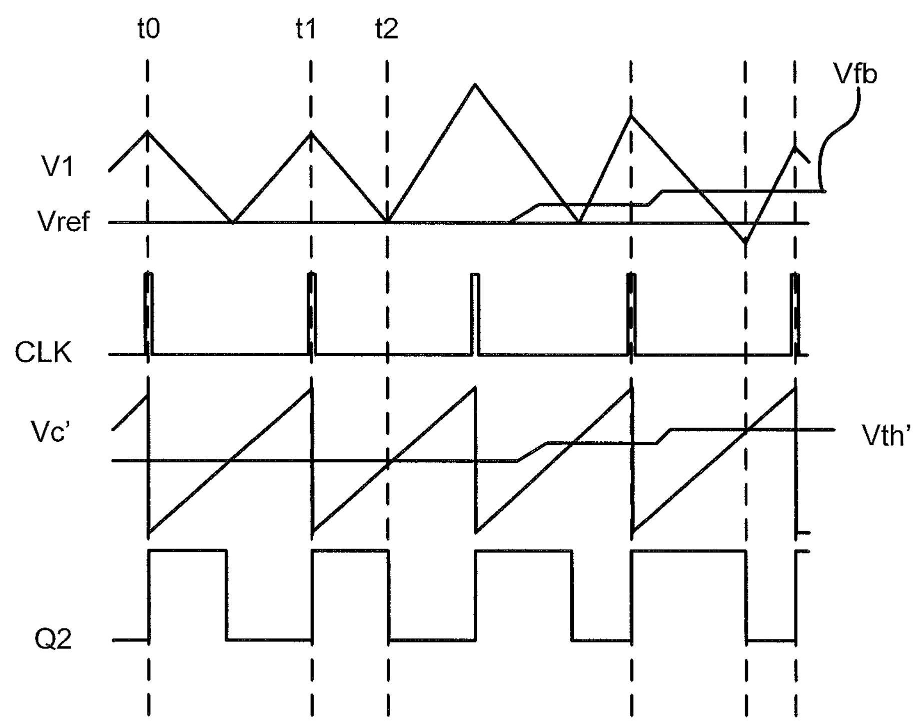
FIG. 3C is a waveform diagram showing example operation of the switching regulator in accordance with the third embodiment of the present disclosure.

FIG. 3C is a waveform diagram showing example operation of the switching regulator shown in FIG. 3A and FIG. 3B. The present embodiment is different from the second embodiment in that triangular wave Vc' output by the triangular wave generator has a predetermined frequency and a predetermined amplitude, as well as that threshold voltage varies with difference between feedback voltage Vfb and reference voltage Vref. When the feedback voltage increases, the difference between feedback voltage Vfb and reference voltage Vref increases, which leads to an increase in threshold voltage Vth', so that in each period time interval during which triangular wave Vc' is less than threshold voltage Vth' increases. Then, on-time Ton of second control signal Q2 output by comparing circuit 322*d* for controlling the rectifying switch increases (i.e. on-time Ton of rectifying switch PS2 increases), so that more energy is released in a period through rectifying switch PS2, which results in that Vfb may converge to Vref faster to maintain the output voltage substantially constant. Therefore, it is not necessary for power switch PS1 to decrease the switching frequency for a power balance. Eventually, the switching frequency of power switch PS1 in power stage may be restricted approximately at that of rectifying switch PS2 so that audio noise is avoided.

In the present embodiment, the threshold voltage is controlled in accordance with the difference between the feedback voltage and the reference voltage, so that a second control signal for rectifying switch with longer on-time is generated when there is a larger deviation between the feedback voltage and the reference voltage. Therefore, it is not necessary for the first controller to change the switching frequency significantly, and the audio noise is avoided. The circuit in the present embodiment has advantages of compact structure, less switches and ease of implementation.

Figure 4:
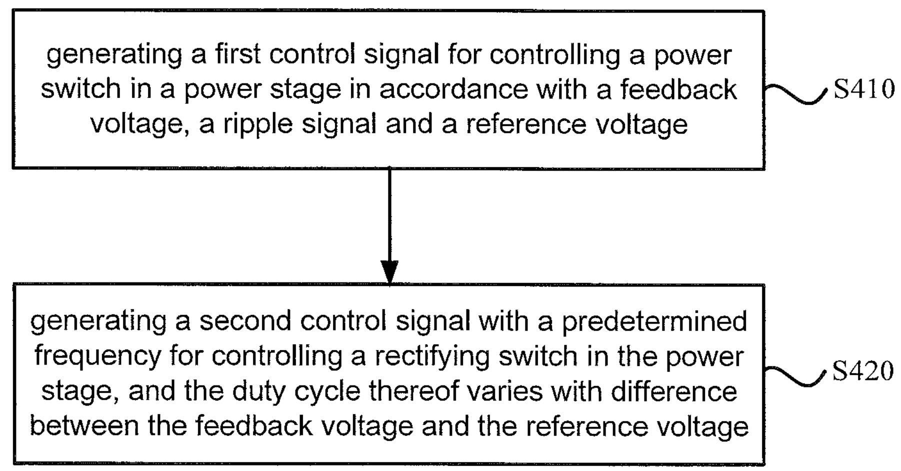
FIG. 4 is a flow chart of a method for controlling a switching regulator in accordance with a fourth embodiment of the present disclosure.

FIG. 4 is a flow chart of a method for controlling a switching regulator in accordance with a fourth embodiment of the present disclosure. As shown in FIG. 4, the method comprises:

S410. generating a first control signal for controlling a power switch in a power stage in accordance with a feedback voltage, a ripple signal and a reference voltage; wherein the feedback voltage is obtained in accordance with an output voltage of the power stage, and S420. generating a second control signal with a predetermined frequency for controlling a rectifying switch in the power stage, and the duty cycle thereof varies with difference between the feedback voltage and the reference voltage.

The abovementioned steps are implemented synchronously.

Furthermore, step S420 may comprises:

S420*a*. generating an error signal proportional to the difference between the feedback voltage and the reference voltage according thereto;

S420*b*. generating a wave with a predetermined frequency; wherein the wave rises from an initial value in a period corresponding to the predetermined frequency and drops to the initial value at the end of the period, and the slope thereof is determined by the error signal; and S420*c*. generating the second control signal in accordance with the wave and a constant threshold voltage.

Alternatively, step S420 may comprises:

S420*a*'. generating an error signal proportional to the difference between the feedback voltage and the reference voltage according thereto;

S420*b*'. generating a threshold voltage varies with the error parameter;

S420*c*'. generating a triangular wave with a predetermined frequency and a predetermined amplitude; and, S420*d*'. generating the second control signal in accordance with the triangular wave and the threshold voltage varying with the error signal.

In the present embodiment, by means of controlling the rectifying switch in the power stage with the second control signal which has a predetermined frequency and varies in accordance with the difference between a feedback voltage and a reference voltage, more energy may be shunted when a switching regulator operates in a light loaded or unloaded condition, so that audio noise is avoided.

The foregoing description describes specific embodiments of the present invention. However, they have been presented for purposes of illustration and description. It is intended that the scope of the invention be defined by the claims appended hereto and their equivalents. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

I claim:

1. A control circuit, comprising:

a first controller configured to generate a first control signal for controlling a power switch in a power stage to accumulate energy in an inductive element in accordance with a feedback voltage representing an output voltage of said power stage, a ripple signal and a reference voltage; and a second controller configured to generate a second control signal with a predetermined frequency for controlling a rectifying switch in said power stage, wherein, a duty cycle of said second control signal varies with a difference between said feedback voltage and said reference voltage so that a current through said inductive element is shunted by said rectifying switch in a lightly loaded or unloaded condition.

2. The control circuit according to claim 1, wherein said second controller comprises:

an error amplifier configured to output an error signal representing said difference in accordance with said feedback voltage and said reference voltage;

a wave generator configured to generate a wave with said predetermined frequency, wherein said wave rises from an initial level in each period corresponding to said predetermined frequency and drops to said initial level at the end of said period, wherein a slope of said wave is determined by said error signal; and a comparing circuit configured to generate said second control signal in accordance with said wave and a constant threshold voltage.

3. The control circuit according to claim 2, wherein said wave generator comprises a current source, a capacitor and a discharge switch; wherein said error amplifier is a transconductance amplifier;

wherein said current source is coupled to a wave output terminal, said capacitor is coupled between said wave output terminal and a ground in parallel with said discharge switch, said wave output terminal is coupled to an output terminal of said transconductance amplifier and an input terminal of said comparing circuit;

wherein said discharge switch is controlled by a clock with said predetermined frequency.

4. The control circuit according to claim 1, wherein second controller comprises:

an error amplifier configured to output an error signal representing said difference in accordance with said feedback voltage and said reference voltage;

a threshold generator configured to generate a threshold voltage varying with said error signal;

a triangular wave generator configured to generate a triangular wave with said predetermined frequency and a constant amplitude; and a comparing circuit configured to generate said second control signal in accordance with said triangular wave and said threshold voltage.

5. The control circuit according to claim 4, wherein said error amplifier is a transconductance amplifier, said threshold generator comprises a resistor coupled between an output terminal of said transconductance amplifier and a reference terminal; or said error amplifier is an operational amplifier, said threshold generator is an RC circuit.

6. The control circuit according to claim 1, wherein said predetermined frequency is greater than 20 KHz.

7. The control circuit according to claim 1, wherein said duty cycle of said second control signal is substantially constant in a case that said difference between said feedback voltage and said reference voltage is maintained constant approximately at zero so that said energy released from said rectifying switch during each switching period is substantially constant.

8. The control circuit according to claim 1, wherein said first controller comprises:

a set pulse generator configured to generate a set pulse in accordance said feedback voltage, said ripple signal and said reference voltage;

a reset pulse generator configured to generate a reset pulse; and a logic circuit configured to output said first control signal which turns on said power switch when said set pulse is valid and turns off said power switch when said reset pulse is valid.

9. The control circuit according to claim 8, wherein said set pulse generator is configured to generate said set pulse approximately at energy peak or energy valley of said inductive element.

10. The control circuit according to claim 8, further comprising:

a voltage feedback circuit which feeds back said output voltage of said power stage as said feedback voltage; and a ripple generator which is coupled to one terminal of said inductive element and generates said ripple signal, wherein said set pulse generator comprises a comparator which receives a voltage obtained by superimposing said feedback voltage and said ripple signal, receives said reference voltage, and outputs said set pulse.

11. The control circuit according to claim 10, wherein said ripple generator comprises a current sampling circuit which represents a current through said inductive element as said ripple signal.

12. The control circuit according to claim 8, wherein said set pulse generator comprises:

a first comparator which receives said feedback voltage and said reference voltage, and outputs an error voltage; and a second comparator which receives said error voltage and said ripple signal, and outputs said set pulse.

13. The control circuit according to claim 12, further comprising a ripple generator which is coupled to one terminal of said inductive element and generates said ripple signal.

14. The control circuit according to claim 13, wherein said ripple generator comprises a current sampling circuit which represents a current through said inductive element as said ripple signal.

15. A switching regulator, comprising: a power stage with a power switch, a rectifying switch and an inductive element; and a control circuit, comprising a first controller configured to generate a first control signal for controlling said power switch in a power stage in accordance with a feedback voltage representing an output voltage of said power stage, a ripple signal and a reference voltage; and a second controller configured to generate a second control signal with a predetermined frequency for controlling said rectifying switch in said power stage to release energy in said inductive element, wherein, a duty cycle of said second control signal varies with a difference between said feedback voltage and said reference voltage so that a current through said inductive element is shunted by said rectifying switch in a lightly loaded or unloaded condition.

16. A method for controlling a switching regulator, comprising:

generating a first control signal for controlling a power switch in a power stage to accumulate energy in an inductive element in accordance with a feedback voltage representing an output voltage of said power stage, a ripple signal and a reference voltage; and generating a second control signal with a predetermined frequency for controlling a rectifying switch in said power stage to release energy in said inductive element, wherein the duty cycle of said second control signal varies with a difference between the feedback voltage and the reference voltage so that a current through said inductive element is shunted by said rectifying switch in a lightly loaded or unloaded condition.

17. The method according to claim 16, wherein said generating said second control signal with said predetermined frequency for controlling said rectifying switch in said power stage comprises:

outputting an error signal representing said difference in accordance with said feedback voltage and said reference voltage;

generating a wave with said predetermined frequency; wherein said wave rises from an initial level in a period corresponding to said predetermined frequency and drops to said initial level at the end of said period, wherein, the rising slope of said wave is determined by said difference; and generating said second control signal in accordance with said wave and a constant threshold voltage.

18. The method according to claim 16, wherein said generating said second control signal with said predetermined frequency for controlling said rectifying switch in said power stage comprises:

outputting an error signal in accordance with said feedback voltage and said reference voltage;

generating a threshold voltage varying with said error signal;
generating a triangular wave with said predetermined frequency and a predetermined amplitude; and
generating said second control signal in accordance with said triangular wave and said threshold voltage.

* * * * *